(12) United States Patent
Park et al.

(10) Patent No.: US 10,818,905 B2
(45) Date of Patent: Oct. 27, 2020

(54) BATTERY PACK

(71) Applicant: LG Chem, Ltd., Seoul (KR)

(72) Inventors: Jong Pil Park, Daejeon (KR); Jong Su Lee, Daejeon (KR); Seung Don Choi, Daejeon (KR)

(73) Assignee: LG Chem, Ltd. (KR)

( * ) Notice: Subject to any disclaimer, the term of this patent is extended or adjusted under 35 U.S.C. 154(b) by 119 days.

(21) Appl. No.: 16/114,684

(22) Filed: Aug. 28, 2018

(65) Prior Publication Data

US 2019/0067672 A1 Feb. 28, 2019

(30) Foreign Application Priority Data

Aug. 29, 2017 (KR) .................. 10-2017-0109438

(51) Int. Cl.

| | |
|---|---|
| *H01M 2/34* | (2006.01) |
| *H01M 2/10* | (2006.01) |
| *H01M 2/20* | (2006.01) |
| *H01M 10/42* | (2006.01) |
| *H01M 10/04* | (2006.01) |
| *H01M 2/02* | (2006.01) |

(52) U.S. Cl.
CPC ........... *H01M 2/34* (2013.01); *H01M 2/0275* (2013.01); *H01M 2/1061* (2013.01); *H01M 2/1077* (2013.01); *H01M 2/204* (2013.01); *H01M 2/206* (2013.01); *H01M 10/0413* (2013.01); *H01M 10/425* (2013.01); *H01M 2/0217* (2013.01); *H01M 2010/4271* (2013.01); *H01M 2200/00* (2013.01)

(58) Field of Classification Search
CPC combination set(s) only.
See application file for complete search history.

(56) References Cited

U.S. PATENT DOCUMENTS 7,785,731 B2 * 8/2010 Cherng ................. H01M 2/021
429/136

FOREIGN PATENT DOCUMENTS

| JP | 2013206734 A | 10/2013 |
|---|---|---|
| KR | 19990001651 A | 1/1999 |
| KR | 10-1072955 B1 | 10/2011 |
| KR | 20150049284 A | 5/2015 |

* cited by examiner

*Primary Examiner* — Ula C Ruddock
*Assistant Examiner* — Sarika Gupta
(74) *Attorney, Agent, or Firm* — Lerner, David, Littenberg, Krumholz & Mentlik, LLP

(57) ABSTRACT

A battery pack comprises first and second battery cells stacked in a vertical direction and a safety device that connects a first electrode lead provided in the first battery cell to a second electrode lead provided in the second battery cell to allow current to flow therebetween or separates the first electrode lead and the second electrode lead from each other to break the current when the first and/or second battery cells swell due to overcharging and/or overcurrent. In particular, the safety device comprises a connection member that electrically connects the first and second electrode leads to each other and a movable member that linearly moves the connection member when the first and second battery cells swell and separates the first electrode lead and the second electrode lead from each other, thereby breaking the current.

13 Claims, 6 Drawing Sheets

BATTERY PACK

CROSS-REFERENCE TO RELATED APPLICATIONS

This application claims the priority of Korean Patent Application No. 10-2017-0109438, filed on Aug. 29, 2017, the disclosure of which is incorporated herein by reference.

BACKGROUND OF THE INVENTION

Field of the Invention

The present disclosure relates to a battery pack, and more particularly, to a battery pack that achieves an improved safety by breaking current when a battery cell swells due to overcharging or overcurrent.

Description of the Related Art

In general, rechargeable or secondary batteries refer to chargeable and dischargeable batteries, unlike primary batteries that is impossible to charge. Such a secondary battery includes a low capacity battery pack used for portable electronic equipment such as a mobile phone, a notebook computer, and a camcorder, and the like and a large capacity battery pack used for motor driving current such as a hybrid vehicle. The battery pack comprises a battery module in which a plurality of battery cells are connected in series and a battery case built in the battery module. However, the battery pack has a limitation in that when overcharging or overcurrent due to short circuit occurs, the battery module swells to cause explosion or ignition.

SUMMARY

An aspect of the present disclosure provides a battery pack that prevents a battery module from exploding or igniting by breaking current when the battery module swells due to overcharging and overcurrent, resulting in an improved safety.

According to an aspect of the present disclosure, a battery pack may include first and second battery cells stacked in a vertical direction, and a safety device that connects a first electrode lead provided in the first battery cell to a second electrode lead provided in the second battery cell to allow current to flow therebetween. The safety device is configured to separate the first electrode lead and the second electrode lead from each other to break the current when the first and/or second battery cells swell due to overcharging and/or overcurrent. The safety device may further include a connection member that electrically connects the first and second electrode leads to each other, and a movable member that is configured to move linearly when the first and/or second battery cells swell to allow the connection member to linearly move and separate the first electrode lead and the second electrode lead from each other, thereby breaking the current.

The safety device may also include a case provided between the first and second battery cells and having upper and lower portions to which front ends of the first and second electrode leads are respectively fixed. In particular, the connection member may contact the front ends of the first and second electrode leads to flow the current between the first and second electrode leads, and the movable member may include a head part free-rotatably coupled to the connection member and configured to separate the connection member from the first and second electrode leads when moving forward to break the current. The movable member may further include a screw part screw-coupled to a screw bore of the case and allowing the head part to move forward while being withdrawn from the screw bore when rotating, and a rotating gear part disposed on an end of the screw part to allow the screw part to rotate. The safety device may further include a first operation member attached to the first battery cell, engaged with the rotating gear part through a first aperture defined in the case, and configured to rotate the rotating gear part while moving in a direction approaching the case by swelling force of the first battery cell.

Each of the first battery cell and the second battery cell may comprise an electrode assembly and a pouch including an accommodation part that accommodates the electrode assembly and a sealing part that seals the accommodation part. In particular, the first and second electrode leads may be coupled to the electrode assembly and the front ends of the first and second electrode leads may be withdrawn to the outside through the pouch. The case may be disposed between the sealing part of the pouch from which the first electrode lead of the first battery cell is withdrawn, and the sealing part of the pouch from which the second electrode lead of the second battery cell is withdrawn.

The case may comprise a fixing part attached to each of outer surfaces of the sealing part of the first battery cell and the sealing part of the second battery cell, and a mounting part disposed on each of inner surfaces of the sealing part of the first battery cell and the sealing part of the second battery cell and having the first aperture into which the first operation member is inserted. The mounting part may have a thickness less than a thickness of the fixing part to secure a moving space of the first operation member between the sealing part of the first battery cell and the first aperture.

The front end of the first electrode lead of the first battery cell and the front end of the second electrode lead of the second battery cell may be folded to face the case to form a first folded front end and a second folded front end, and the first folded front end and the second folded front end may be respectively coupled to upper and lower portions of the case with respect to the screw bore of the case. The connection member may have a rectangular plate shape and contacts the front ends of the first and second electrode leads, which are fixed to the case, simultaneously to flow the current between the first and second electrode leads.

Further, the first operation member may comprise a first support part attached to an inner surface of the sealing part of the first battery cell, and a first gear part engaged with the rotating gear part of the movable member through the first aperture The safety device may comprise a first guide member that guides the first gear part to linearly move the first gear part along the first aperture, wherein the first guide member may comprise a guide protrusion disposed along a longitudinal direction in an inner surface of the first aperture, and a guide groove which is defined along the longitudinal direction in an outer surface of the first gear part and to which the guide protrusion may be slidably coupled.

The safety device may further comprise a second operation member attached to the second battery cell, engaged with the rotating gear part through a second aperture defined in the case, and configured to rotate the rotating gear part while moving in a direction approaching the case by swelling force of the second battery cell. The second operation member may comprise a second support part attached to an inner surface of the sealing part of the second battery cell, and a second gear part engaged with the rotating gear part of the movable member through the second aperture defined in the case.

Further, the safety device may comprise a second guide member that guides the second gear part to linearly move the second gear part along the second aperture, wherein the second guide member may comprise a guide protrusion disposed along a longitudinal direction in an inner surface of the second aperture, and a guide groove which is defined along the longitudinal direction in an outer surface of the second gear part and to which the guide protrusion may be slidably coupled.

Each of the case, the movable member, and the first and second operation members may be made of an electrically insulating material. The connection member may be made of an electrically conducting material.

The head part may comprise a release preventing member coupled to the screw part, on which the connection member is disposed, to allow the head part to be free-rotatably coupled to the connection member.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
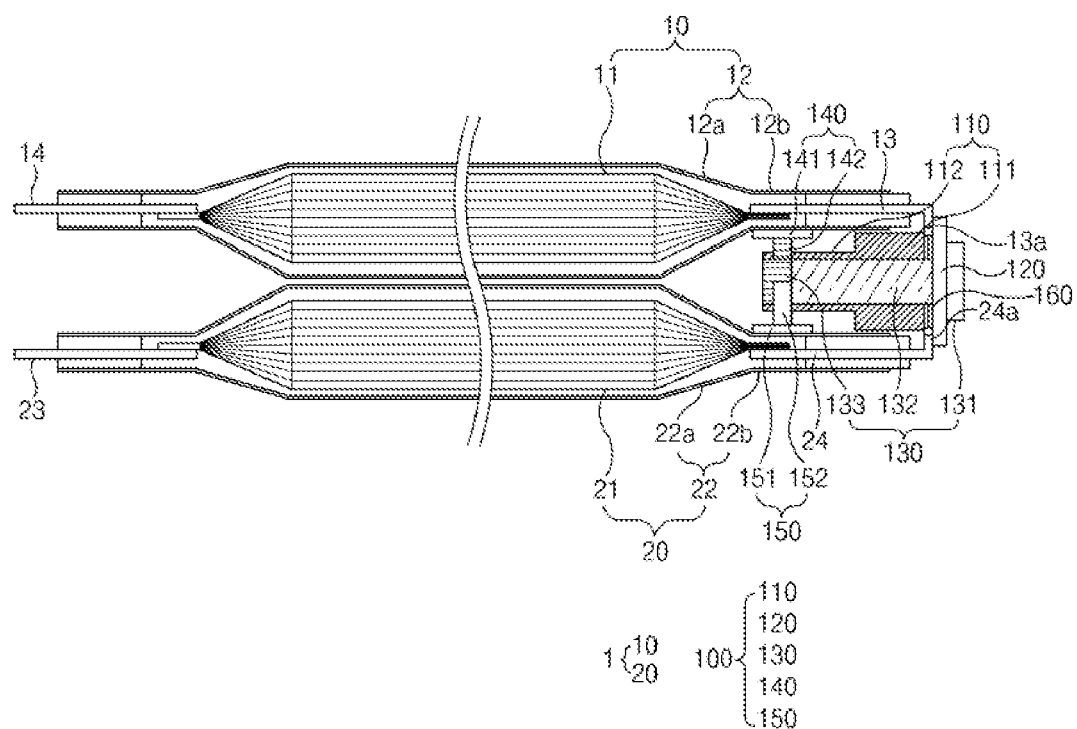
FIG. 1 is a cross-sectional view of a battery pack according to an exemplary embodiment of the present disclosure.

Advantages and features of the present disclosure and methods of achieving the same will become apparent with reference to the exemplary embodiments described in detail below in conjunction with the accompanying drawings. However, the present disclosure is not limited to the exemplary embodiments disclosed below, but may be provided in various different forms. The present exemplary embodiments are merely provided to make the disclosure complete and to fully inform the category of the disclosure to a person having ordinary knowledge in the technical field to which the present disclosure pertains, and the present disclosure is only defined by the scope of the claims.

Accordingly, in some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

Hereinafter, exemplary embodiments of the present disclosure will be described in detail with reference to the accompanying drawings in such a manner that the technical idea of the present disclosure may easily be carried out by a person with ordinary skill in the art to which the disclosure pertains. The present disclosure may, however, be embodied in different forms and should not be construed as limited to the exemplary embodiments set forth herein. In the drawings, elements unnecessary for describing the present disclosure will be omitted for clarity, and also like reference numerals in the drawings denote like elements.

As illustrated in FIG. 1, a battery pack according to an exemplary embodiment of the present disclosure may comprise a safety device 100 that prevents a battery module 1 from exploding or igniting, by breaking current when the battery module 1 swells due to overcharging and/or overcurrent.

1. Battery Module

The battery module 1 may comprise first and second battery cells 10 and 20 that are sequentially stacked in a vertical direction, and the first and second battery cells 10 and 20 may be connected to each other in series. For example, the first battery cell 10 may comprise an electrode assembly 11, a pouch 12 that accommodates the electrode assembly 11, and first and second electrode leads 13 and 14 which are coupled to the electrode assembly 11 and of which front ends are withdrawn to the outside through the pouch 12. The pouch 12 may comprise an accommodation part 12a that accommodates the electrode assembly 11 and a sealing part 12b that seals the accommodation part 12a.

The second battery cell 20 may comprise an electrode assembly 21, a pouch 22 that accommodates the electrode assembly 21, and first and second electrode leads 23 and 24 which are coupled to the electrode assembly 21 and of which front ends are withdrawn to the outside through the pouch 22. The pouch 22 may comprise an accommodation part 22a that accommodates the electrode assembly 21 and a sealing part 22b that seals the accommodation part 22a.

The first electrode may be a positive electrode, and the second electrode may be a negative electrode. Also, the first electrode lead may be a positive electrode lead, and the second electrode lead may be a negative electrode lead. In particular, the first electrode lead 13 of the first battery cell 10 and the second electrode lead 24 of the second battery cell 20 may be disposed to correspond to each other and connected to each other. Thus, the first and second battery cell 10 and 20 may be connected to each other in series.

In the battery module 1, when overcharging or overcurrent due to an impact of an external object such as a needled-shaped object occurs, the first and second battery cells 10 and 20 may swell to cause explosion and/or ignition.

To prevent this phenomenon from occurring, the battery pack according to the present disclosure may comprise a safety device 100 that separates the first and second battery cells 10 and 20 from each other to prevent current from flowing therebetween when the overcharging and the overcurrent occur in the battery module 1, thereby preventing the battery module 1 from exploding or igniting through the safety device 100.

Particularly, the safety device 100 may connect the first electrode lead 13 provided in the first battery cell 10 and the second electrode lead 24 provided in the second battery cell 20, which correspond to each other, to each other to allow current to flow therebetween. In addition, when the first and second battery cells 10 and 20 swell due to the overcharging and/or overcurrent, the safety device 100 may separate the first electrode lead 13 and the second electrode lead 24 from each other to break the current. Hereinafter, the safety device will be described in more detail.

2. Safety Device

Figure 2:
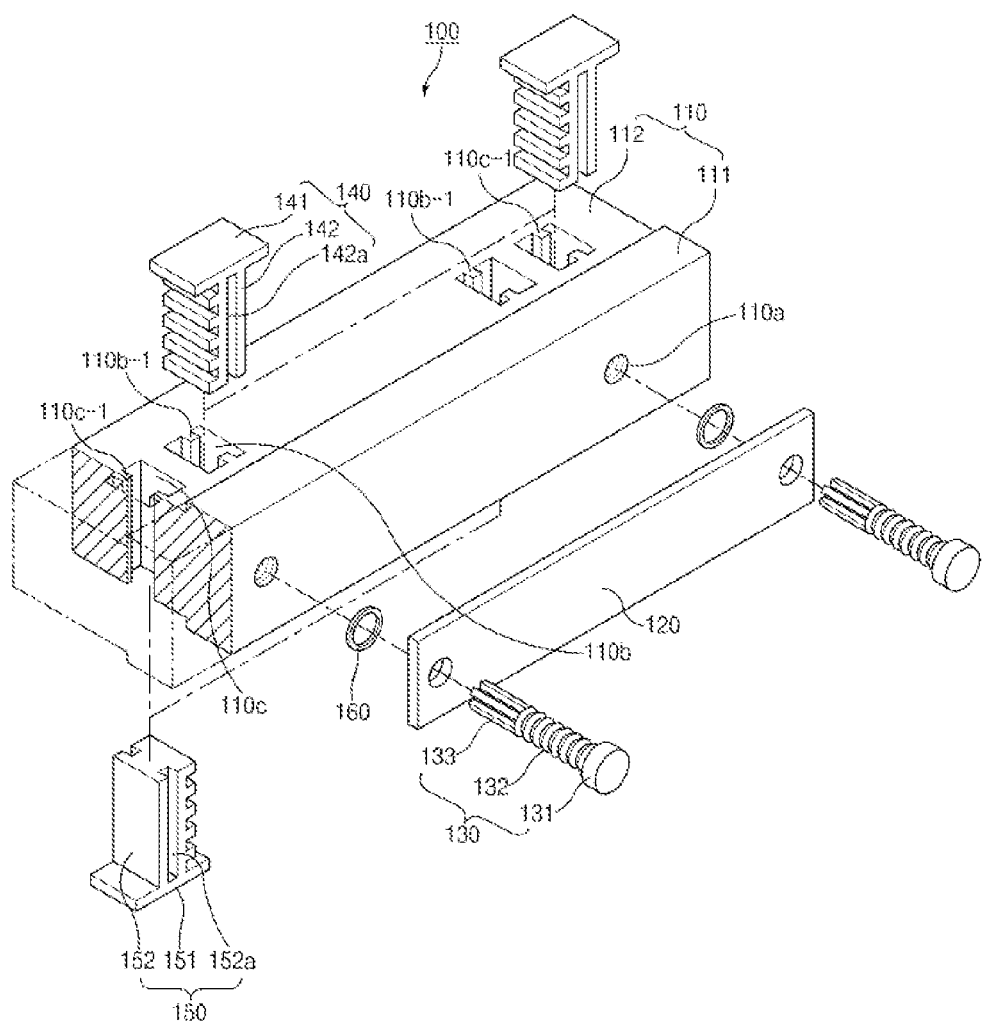
FIG. 2 is an exploded perspective view of a safety device according to an exemplary embodiment of the present disclosure.
Figure 3:
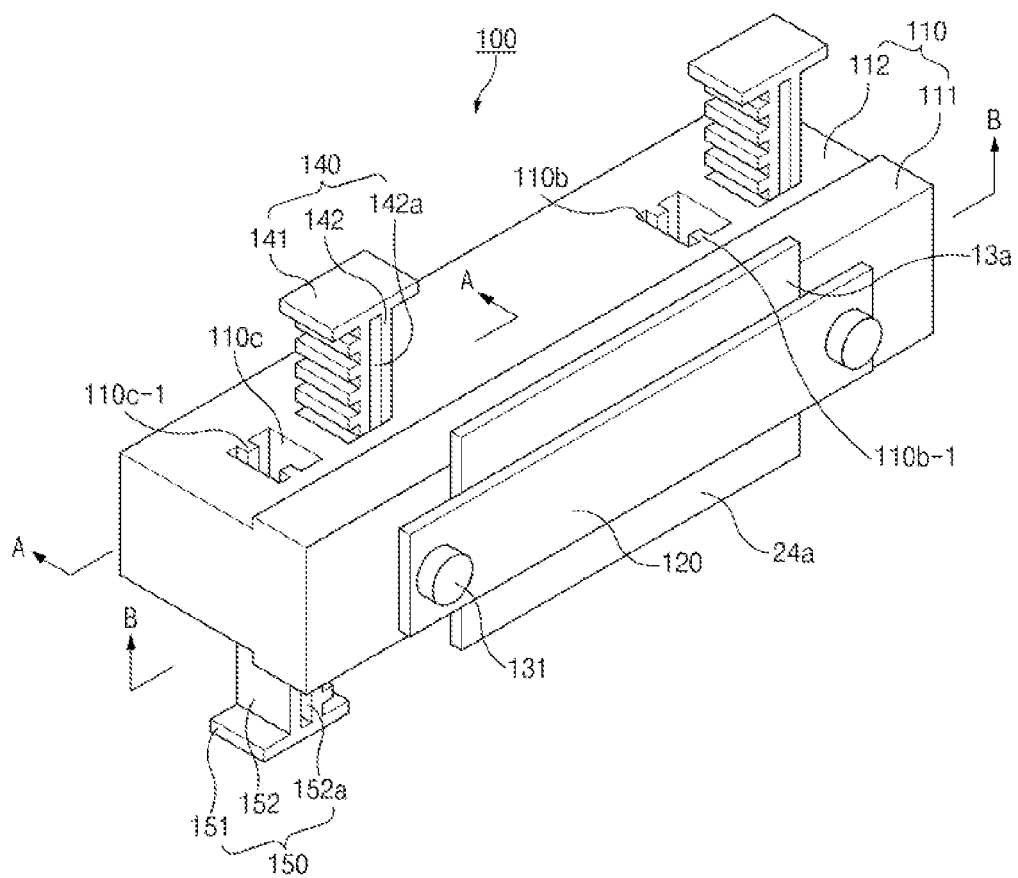
FIG. 3 is an assembled perspective view of the safety device according to an exemplary embodiment of the present disclosure.

As illustrated in FIGS. 2 and 3, the safety device 100 may comprise a case 110, a connection member 120, a movable member 130, a first operation member 140, and a second operation member 150.

Case

The case 110 may be configured to fix the first and second electrode leads and may be disposed between the first and second battery cells 10 and 20. The first electrode lead 13 of the first battery cell 10 and the second electrode lead 24 of the second battery cell 20 may be fixed to upper and lower portions of the case 110 to correspond to each other, respectively. Referring to FIG. 1, the case 110 may be disposed between the first and second battery cells 10 and 20. When viewed in FIG. 1, a front end of the first electrode lead 13 of the first battery cell 10 and a front end of the second electrode lead 24 of the second battery cell 20 may be fixed to upper and lower portions of the case 110 to correspond to each other, respectively.

The front end of the first electrode lead 13 of the first battery cell 10 and the front end of the second electrode lead 24 of the second battery cell 20 may be folded to face a front surface of the case 110 and thereby to form a first folded front end 13a and a second folded front end 24a, and the first folded front end 13a and the second folded front end 24a may be respectively coupled to upper and lower sides of the front surface of the case 110 through welding or an adhesion layer. Thus, coupling force between the case 110 and the first and second electrode leads 13 and 24 may increase. As a result, even when the first and second battery cells swell, the case 110 may be maintained in the state in which the case 110 is stably coupled to the first electrode lead 13 and the second electrode lead 24.

A screw bore 110a to which the movable member 130 is coupled may be defined in the front surface of the case 110 between the first folded front end 13a and the second folded front end 24a. The screw bore 110a may be defined to pass from the front surface to the other surface of the case 110. Also, a first aperture 110b into which the first operation member 140 is inserted may be defined in a top surface of the case 110, which is disposed to face the first battery cell 10. The first aperture 110b may be defined to pass from the top surface to a bottom surface of the case 110.

The case 110 may be disposed between a sealing part 12b of the pouch 12, from which the first electrode lead 13 of the first battery cell 10 is withdrawn, and a sealing part 22b of the pouch 22, from which the second electrode lead 14 of the second battery cell 20 is withdrawn. Particularly, the case 110 may be attached to the sealing parts 12b and 22b of the first and second battery cells 10 and 20 to improve adhesion and coupling properties.

Particularly, the case 110 may comprise a fixing part 111 attached to each of outer surfaces of the sealing part 12b of the first battery cell 10 and the sealing part 22b of the second battery cell 20 and a mounting part 112 disposed on each of inner surfaces of the sealing part 12b of the first battery cell 10 and the sealing part 22b of the second battery cell 20 and having the first aperture 110b into which the first operation member 140 may be inserted. The mounting part 112 may have a thickness less than a thickness of the fixing part 111. Thus, the mounting part 112 may provide a moving space of the first operation member 140 between the sealing part 12b of the first battery cell 10 and the first aperture 110b. As a result, when the first battery cell 10 swells, the first operation member 140 may move within the moving space.

A second aperture 110c into which the second operation member 150 is inserted may be defined in the bottom surface of the case 110, which is disposed to face the second battery cell 20. The second aperture 110c may be defined to pass from the bottom surface to the top surface of the case 110.

Referring to FIG. 2, the first aperture 110b and the second aperture 110c may be defined in left and right sides of the top surface of the case 110 with respect to the screw bore 110a.

Connection Member

The connection member 120 may connect the first and second electrode leads to each other and may linearly move to separate the first and second electrode leads from each other. The connection member 120 may abut a front end of the first electrode lead 13 of the first battery cell 10 and a front end of the second electrode lead 24 of the second battery cell 20 to allow current to flow between the first and second electrode leads 13 and 24.

For example, the connection member 120 may have a long rectangular plate shape. The connection member 120 may abut the front ends of the first and second electrode leads 13 and 24, which are fixed to the case 110, simultaneously to allow the current to flow between the first and second electrode leads 13 and 24. The connection member 120 may be made of a conductive metallic material. Thus, the current may flow between the first and second electrode leads 13 and 24.

Movable Member

The movable member 130 may be configured to separate the connection member from the first and second electrode leads. For example, the movable member 130 may include a head part 131 free-rotatably coupled to the connection member 120 and separating the connection member 120 from the front ends of the first and second electrode leads 13 and 24 when moving forward to break the current, a screw part 132 screw-coupled to the screw bore 110a of the case 110 and allowing the head part 131 to move forward while being withdrawn from the screw hole 110a when rotating, and a rotating gear part 133 disposed on an end of the screw part 132 to allow the screw part 132 to rotate.

In other words, the movable member 130 may be withdrawn from the screw bore 110a while the screw part 132 rotates by the rotation of the rotating gear part 133, may allow the head part 131 to move forward while the screw part 132 is withdrawn from the screw bore 110a, and allow the connection member 120 to move forward while the head part 131 moves forward. Thus, the connection member 120 and the first and second electrode leads 13 and 24 may be separated from each other to break the current.

Further, the head part 131 may be free-rotatably coupled to the connection member by a release preventing member 160. Referring to FIG. 2, the head part 131 may be free-rotatably supported on the outer surface of the connection member 120, and the release preventing member 160 may be coupled to the screw part 132 disposed on the inner surface of the connection member 120 to prevent the screw part 132 from being released. The head part 131 and the release preventing member 160 may be disposed on opposite sides with respect to the connection member 120.

Thus, when the screw part 132 is withdrawn from the screw bore 110a while rotating, the head part 131 and the release preventing member 160 may rotate to move forward by being interlocked with the screw part 132. The connection member 120 may be separated from the first and second electrode leads 13 and 24 while moving forward by the release preventing member 160, and the head part 131 may rotate in the state of being supported on the connection member 120 by the release preventing member 160.

The release preventing member 160 may have a thickness less than a thickness of the connection member 120. Thus, a phenomenon in which the connection member 120 is not supported on the first and second electrode leads 13 and 24 due to the release preventing member 160 may be prevented.

First Operation Member

The first operation member 140 may be attached to the first battery cell 10, engaged with the rotating gear part 133 through the first aperture 110b defined in the case 110, and may rotate the rotating gear part 133 while moving in a direction approaching the case 110 by swelling force generated when the first battery cell 10 swells. For example, the first operation member 140 may comprise a first support part 141 attached to an inner surface of the sealing part 12b of the first battery cell 10 and a first gear part 142 engaged with the rotating gear part 133 through the first aperture 110b.

Consequently, the first operation member 140 may press the first support part 141 toward the case 110 when the first battery cell 10 swells. In addition, the first operation member 140 may be interlocked with the first support part 141 to allow the first gear part 142 to move along the first aperture 110b, and thus, the first gear part 142 may move to allow the rotating gear part 133 engaged with the first gear part 142 to rotate. In particular, each of the first gear part 142 and the first aperture 110b may have a rectangular shape. Thus, the first gear part 142 may be prevented from rotating within the first aperture 110b. As a result, the first gear part may linearly move.

The safety device 100 may comprise a first guide member that guides the first gear part 142 to linearly move the first gear part 142 along the first aperture 110b. For example, the first guide member may include a guide protrusion 110b-1 disposed along a longitudinal direction of the first aperture 110b and a guide groove 142a which may be defined along a longitudinal direction in an outer surface of the first gear part 142 and to which the guide protrusion 110b-1 may be slidably coupled. Therefore, when the first operation member 140 moves along the first aperture 110b, the guide groove 142a and the guide protrusion 110b-1 may be coupled to each other to allow the first operation member 140 to linearly move in a vertical direction, thereby improving the coupling property and operability.

Second Operation Member

The safety device 100 may further comprise a second operation member 150 that allows the rotating gear part 133 to rotate together with the first operation member 140. The second operation member 150 may be attached to the second battery cell 20, engaged with the rotating gear part 133 through the second aperture 110c defined in the case 110, and may rotate the rotating gear part 133 while moving in a direction approaching the case 110 by swelling force of the second battery cell 20.

For example, the second operation member 150 may include a second support part 151 attached to an inner surface of the sealing part 22b of the second battery cell 20 and a second gear part 152 engaged with the rotating gear part 133 through the second aperture 110b defined in the case 110. Therefore, the second operation member 150 may press the second support part 151 toward the case 110 when the second battery cell 20 swells. In addition, the second operation member 150 may be interlocked with the second support part 151 to allow the second gear part 152 to move along the second aperture 110c, and thus, the second gear part 152 may move to allow the rotating gear part 133 engaged with the second gear part 152 to rotate. Thus, the second operation member 150 may allow the rotating gear part 133 to rotate together with the first operation member 140. As a result, the rotating gear part 133 may stably rotate.

The safety device 100 may comprise a second guide member that guides the second gear part 152 to linearly move the second gear part 152 along the second aperture 110c. The second guide member may include a guide protrusion 110c-1 disposed along a longitudinal direction on an inner surface of the second aperture 110c and a guide groove 152a which is defined along a longitudinal direction in an outer surface of the second gear part 152 and to which the guide protrusion 110c-1 may be slidably coupled. Therefore, when the second operation member 150 moves along the second aperture 110c, the guide groove 152a and the guide protrusion 110c-1 may be coupled to each other to allow the second operation member 150 to linearly move in a vertical direction.

Each of the case 110, the movable member 130, the first operation member 140, and the second operation member 150 may be made of an electrically insulating material such as nonmetal or synthetic resin material. Thus, the flow of the current between the first electrode lead 13 and the second electrode lead 24 through the case 110, the movable member 130, the first operation member 140, and the second operation member 150 may be prevented.

The rotating gear part 133 and the first and second gear parts 142 and 152 may be constituted by a rotating pinion gear and a rack gear that linearly moves. In particular, the rotating gear part 133 may be the pinion gear, and each of the first and second gear parts 142 and 152 may be the rack gear that linearly moves. Thus, the rotating force may be transmitted. The gears are not limited to straight-cut rack and pinion gears, but may include other configurations that may transfer a linear motion to a rotational motion. For example, helical or bevel gears may also be used.

Figure 4:
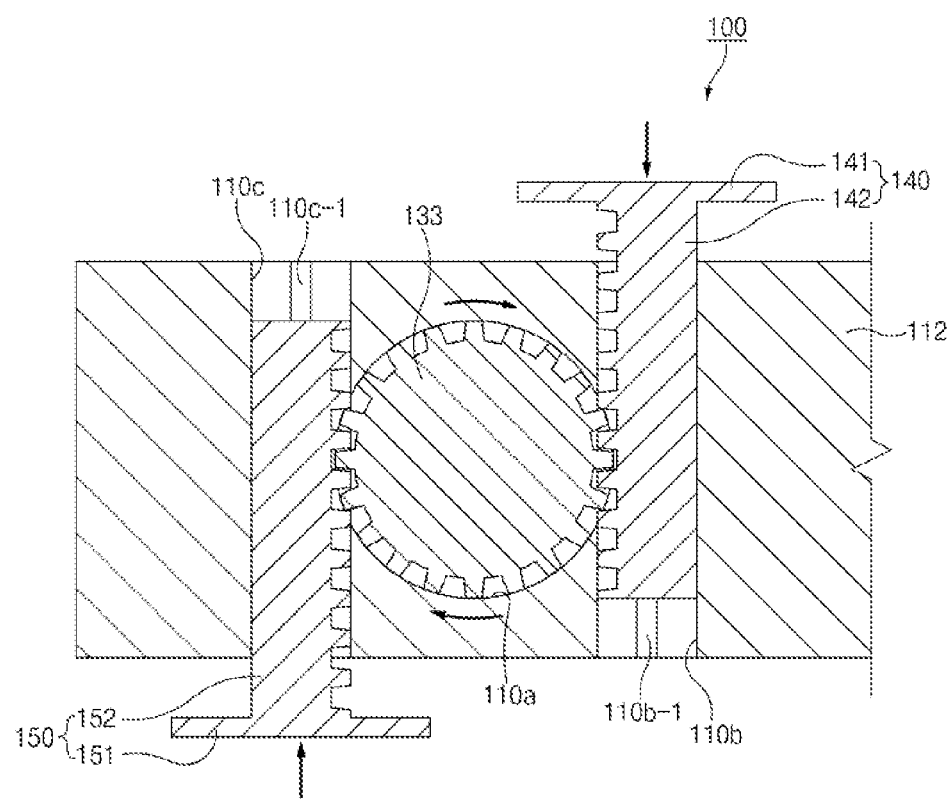
FIG. 4 is a cross-sectional view taken along line A-A of FIG. 3.
Figure 5:
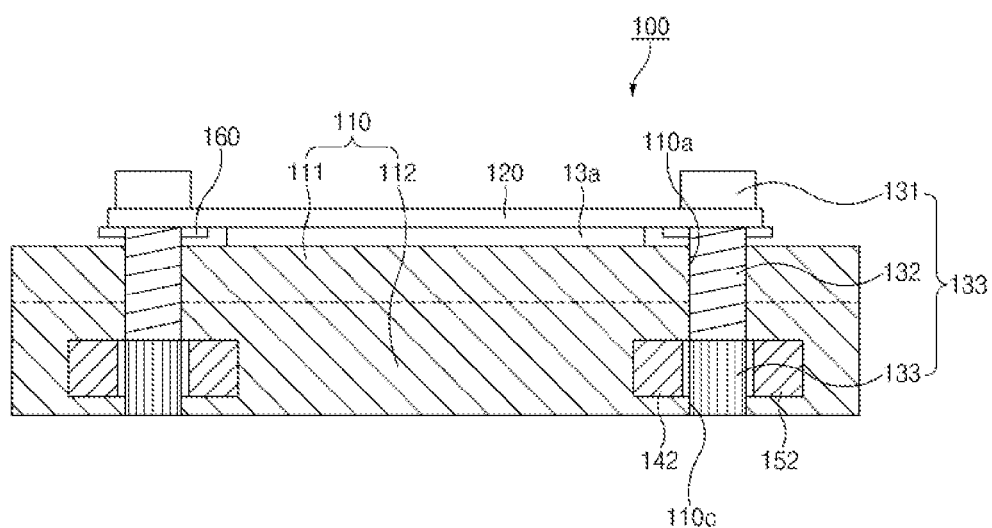
FIG. 5 is a cross-sectional view taken along line B-B of FIG. 3.

As illustrated in FIGS. 4 and 5, the first and second operation members 140 and 150 may be engaged with left and right sides of the rotating gear part 133, respectively. For example, when viewed in FIG. 4, the first operation member 140 may be engaged with the left side of the rotating gear part 133 through the upper portion of the case 110, and the second operation part 150 may be engaged with the right side of the rotating gear part 133 through the lower portion of the case 110. Thus, the first and second operation members 140 and 150 may allow the rotating gear part 133 to rotate simultaneously while moving toward the case 110.

The battery pack having the above-described constituents according to an exemplary embodiment of the present disclosure may comprise the safety device 100 to break the current by separating the first battery cell 10 and the second battery cell 20 from each other when the battery module 1 swells and may thus prevent the battery module 1 from exploding or igniting, thereby improving the safety.

Hereinafter, an operation of the battery pack according to an exemplary embodiment of the present disclosure will be described.

In an operation of the battery pack according to an exemplary embodiment of the present disclosure, referring to FIG. 1, a serial connection structure in which a first electrode lead 13 of the first battery cell 10 and a second electrode lead 24 of a second battery cell 20 may be connected to each other by a connection member 120 to allow current to flow therebetween.

Figure 6:
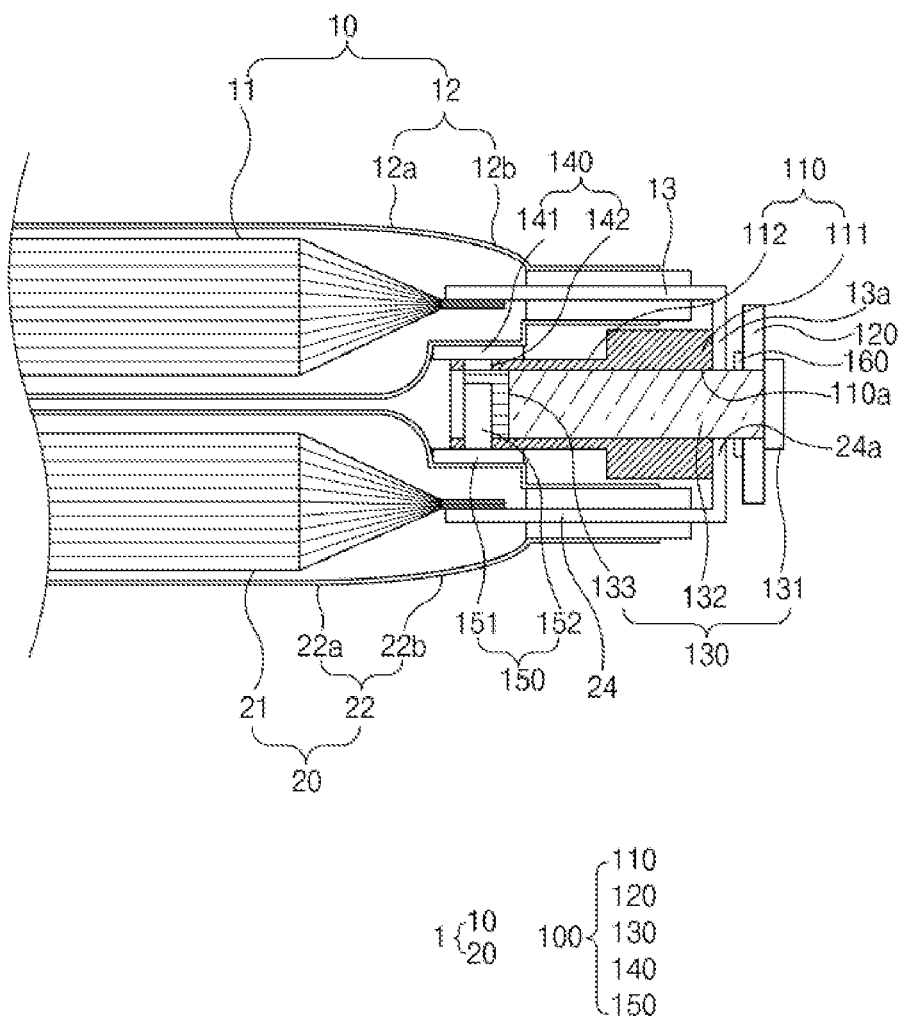
FIG. 6 is a cross-sectional view illustrating a state in which the safety device operates when the battery pack is swelled according to an exemplary embodiment of the present disclosure.

As illustrated in FIG. 6, when overcurrent occurs by overcharging or short circuit due to a physical damage by, for example a needle-shaped object, the first and second battery cells 10 and 20 swell. In particular, an accommodation part of a pouch provided in the first and second battery cells 10 and 20 may swell. The safety device 100 may operate due to the swelling force to separate the first and second battery cells 10 and 20 from each other, thereby breaking current.

In more detail, first and second operation members 140 and 150 may move in a direction approaching the case 110 by the swelling force of the first and/or second battery cells 10 and 20, and while the first and second operation members 140 and 150 move, a movable member 130 may rotate as illustrated in FIG. 4. Then, the movable member 130 may be gradually withdrawn from the case 110 while rotating along a screw bore 110a of the case 110, and while the movable member 130 is withdrawn from the case 110, the movable member 130 may cause a connection member 120 to move forward in a direction that is away from the case 110. Then, while the connection member 120 moves forward, the first electrode lead 13 of the first battery cell 10 and the second electrode lead 24 of the second battery cell 20 may be separated from each other, and thus, the first and second electrode leads 13 and 24 may be separated from each other to break the current that flows between the first and second battery cells 10 and 20.

In particular, the connection member 120 may separate the first electrode lead 13 of the first battery cell 10 and the second electrode lead 24 of the second battery cell 20 from each other while moving forward by a head part 131 of the movable member 130 and a release preventing member 160.

Thus, in the operation of the battery pack according to an exemplary embodiment of the present disclosure, when the first and second battery cells 10 and 20 swell, the safety device 100 may break the current to prevent the explosion and ignition from occurring.

The present disclosure may have effects as follows.

First, the battery pack of the present disclosure may comprise the safety device. Thus, when the first and/or second battery cells swell due to the overcharging and/or the overcurrent, the first battery cell and the second battery cells may be separated from each other to break the current and thereby to prevent the battery cells from exploding or igniting, thereby improving the safety.

Second, the safety device of the present disclosure may comprise the case, the connection member, the movable member, and the first operation member. Thus, when the first and/or second battery cells swell, the first electrode lead of the first battery cell and the second electrode lead of the second battery cell may be separated from each other to prevent the current from flowing therebetween, thereby breaking the current.

Third, the case of the safety device of the present disclosure may be disposed between the sealing parts of the first and second battery cells, from which the first and second electrode leads are withdrawn and may comprise the fixing part and the mounting part. Thus, even though the first and/or second battery cells swell, the stable fixing force may be maintained.

Fourth, the mounting part of the case of the present disclosure may have the thickness less than the thickness of the fixing part. Thus, the moving space of the first operation member may be secured between the sealing part and the operation part of the first battery cell.

Fifth, the connection member of the safety device of the present disclosure may have the rectangular plate shape. Thus, the connection member may simultaneously contact the front end of the first electrode lead of the first battery cell and the front end of the second electrode lead of the second battery cell, which are respectively fixed to the upper and lower portions of the case, thereby connecting the first electrode lead of the first battery cell to the second electrode lead of the second battery cell.

Sixth, the first operation member of the safety device of the present disclosure may comprise the first support part and the first gear part. Thus, when the first battery cell swells, the movable member may be rotated.

Seventh, the safety device of the present disclosure comprises the first guide member that guides the first gear part to linearly move the first gear part along the first aperture defined in the case. Thus, when the first battery cell swells, the first gear part may allow the rotating gear part of the movable member to rotate while the first gear part moves along the first aperture.

Eighth, the safety device of the present disclosure may include the second operation member between the sealing part of the second battery cell and the case. Thus, when the second battery cell swells, the second operation member may allow the movable member to rotate together with the first operation member.

Accordingly, the scope of the present disclosure is defined by the appended claims and the exemplary embodiments described therein. Various modifications made within the meaning of an equivalent of the claims of the disclosure and within the claims are to be regarded to be in the scope of the present disclosure.

What is claimed is:

1. A battery pack comprising:
   first and second battery cells stacked in a vertical direction; and
   a safety device that connects a first electrode lead provided in the first battery cell to a second electrode lead provided in the second battery cell to allow current to flow therebetween, the safety device configured to separate the first electrode lead and the second electrode lead from each other to break the current when the first and/or second battery cells swell,
   wherein the safety device comprises:
   a case provided between the first and second battery cells, the case having upper and lower portions to which front ends of the first and second electrode leads are respectively fixed;
   a connection member that contacts the front ends of the first and second electrode leads to flow the current between the first and second electrode leads; and
   a movable member comprising:
     a head part free-rotatably coupled to the connection member and configured to separate the connection member from the first and second electrode leads when moving forward to break the current;
     a screw part screw-coupled to a screw bore of the case and allowing the head part to move forward while being withdrawn from the screw bore when rotating; and
     a rotating gear part disposed on an end of the screw part to allow the screw part to rotate,
   wherein a first operation member is attached to the first battery cell, engaged with the rotating gear part through a first aperture defined in the case, and configured to rotate the rotating gear part while moving in a direction approaching the case by a swelling force of the first battery cell such that the moveable member is configured to move linearly when the first and/or second battery cells swell to allow the connection member to linearly move and separate the first electrode lead and the second electrode lead from each other, thereby breaking the current.

2. The battery pack of claim 1, wherein each of the first battery cell and the second battery cell comprises:
   an electrode assembly; and
   a pouch including an accommodation part that accommodates the electrode assembly and a sealing part that seals the accommodation part,
   wherein the first and second electrode leads are coupled to the electrode assembly and the front ends of the first and second electrode leads are withdrawn to the outside through the pouch, and
   wherein the case is disposed between the sealing part of the pouch from which the first electrode lead of the first battery cell is withdrawn, and the sealing part of the pouch from which the second electrode lead of the second battery cell is withdrawn.

3. The battery pack of claim 2, wherein the case comprises:
   a fixing part attached to each of outer surfaces of the sealing part of the first battery cell and the sealing part of the second battery cell; and
   a mounting part disposed on each of inner surfaces of the sealing part of the first battery cell and the sealing part of the second battery cell and having the first aperture into which the first operation member is inserted,
   wherein the mounting part has a thickness less than a thickness of the fixing part to secure a moving space of the first operation member between the sealing part of the first battery cell and the first aperture.

4. The battery pack of claim 2, wherein the front end of the first electrode lead of the first battery cell and the front end of the second electrode lead of the second battery cell are folded to face the case to form a first folded front end and a second folded front end, and
   the first folded front end and the second folded front end are respectively coupled to upper and lower portions of the case with respect to the screw bore of the case.

5. The battery pack of claim 4, wherein the connection member has a rectangular plate shape and contacts the front ends of the first and second electrode leads, which are fixed to the case, simultaneously to flow the current between the first and second electrode leads.

6. The battery pack of claim 3, wherein the first operation member comprises:
   a first support part attached to an inner surface of the sealing part of the first battery cell; and
   a first gear part engaged with the rotating gear part of the movable member through the first aperture.

7. The battery pack of claim 6, wherein the safety device comprises a first guide member that guides the first gear part to linearly move the first gear part along the first aperture,
   wherein the first guide member comprises:
   a guide protrusion disposed along a longitudinal direction in an inner surface of the first aperture; and
   a guide groove defined along the longitudinal direction in an outer surface of the first gear part and to which the guide protrusion is slidably coupled.

8. The battery pack of claim 1, wherein the safety device further comprises a second operation member attached to the second battery cell, engaged with the rotating gear part through a second aperture defined in the case, and configured to rotate the rotating gear part while moving in a direction approaching the case by swelling force of the second battery cell.

9. The battery pack of claim 8, wherein the second operation member comprises:
   a second support part attached to an inner surface of the sealing part of the second battery cell; and
   a second gear part engaged with the rotating gear part of the movable member through the second aperture defined in the case.

10. The battery pack of claim 9, wherein the safety device comprises a second guide member that guides the second gear part to linearly move the second gear part along the second aperture,
    wherein the second guide member comprises:
    a guide protrusion disposed along a longitudinal direction in an inner surface of the second aperture; and
    a guide groove defined along the longitudinal direction in an outer surface of the second gear part and to which the guide protrusion is slidably coupled.

11. The battery pack of claim 9, wherein each of the case, the movable member, and the first and second operation members is made of an electrically insulating material.

12. The battery pack of claim 11, wherein the connection member is made of an electrically conducting material.

13. The battery pack of claim 11, wherein the head part comprises a release preventing member coupled to the screw part, on which the connection member is disposed, to allow the head part to be free-rotatably coupled to the connection member.

* * * * *